United States Patent [19]

Nichols

[11] Patent Number: 4,593,871
[45] Date of Patent: Jun. 10, 1986

[54] ON-BOARD TAIL JACK ASSEMBLY
[75] Inventor: Jack E. Nichols, Bellevue, Wash.
[73] Assignee: The Boeing Company, Seattle, Wash.
[21] Appl. No.: 695,877
[22] Filed: Jan. 28, 1985

Related U.S. Application Data
[63] Continuation of Ser. No. 497,697, May 24, 1983, abandoned.

[51] Int. Cl.⁴ .......................... B64D 9/00; B64L 1/22
[52] U.S. Cl. .............................. 244/129.1; 244/118.1
[58] Field of Search ............ 244/118.1, 100 R, 114 R, 244/129.1, 117 R; 254/423; 280/763–766

[56] References Cited

U.S. PATENT DOCUMENTS
| | | | |
|---|---|---|---|
| 1,731,254 | 10/1929 | McNab | 254/423 |
| 2,143,183 | 1/1939 | Barr | 254/423 |
| 3,051,419 | 8/1962 | Weiland et al. | 244/118.1 |
| 3,454,251 | 7/1969 | Dye | 280/765.1 |

FOREIGN PATENT DOCUMENTS
| 16198 | 4/1930 | India | 254/423 |
|---|---|---|---|

Primary Examiner—Sherman D. Basinger
Assistant Examiner—Rodney Corl
Attorney, Agent, or Firm—Hughes & Cassidy

[57] ABSTRACT

An on-board tail jack assembly (20) for stabilizing the tail region (14) of an aircraft (10) during a loading or unloading procedure is comprised of a jack unit (22) disposed within the tail region of the craft in force communication with a frame member thereof for load transfer and distribution upon stabilizing actuation of the jack, which jack includes a reciprocable jack ram member (36) having a distal end terminating in a coupling member (40); and a strut (24) comprising a shaft (80) having a proximal end terminating in a coupling member (114) with a complementary geometric configuration as respects that of the jack unit for mating engagement therewith, which strut further includes a first shaft member (102) and a second shaft member (104) disposed in biased, adjustably displaceable engagement therewith. The strut is configured for disposition beneath the jack during the loading or unloading procedure in stabilizing contact therewith in order to prevent tipping or rocking motion of the craft in the event its center of gravity shifts aft of the main gear.

2 Claims, 8 Drawing Figures

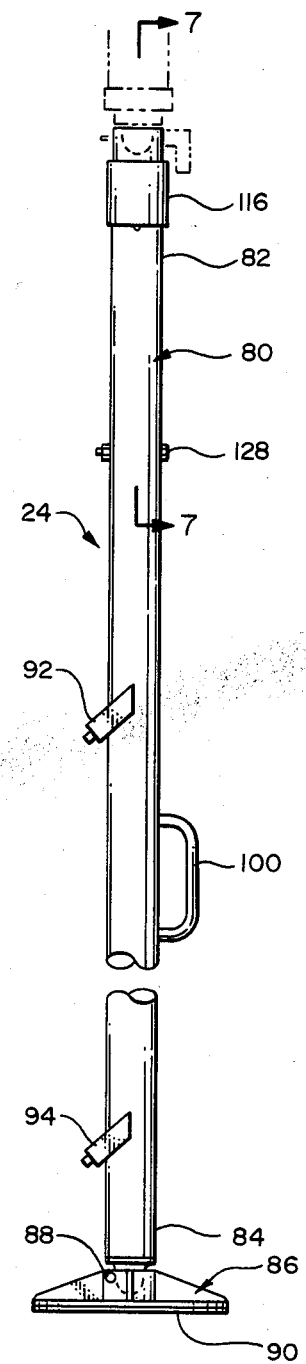
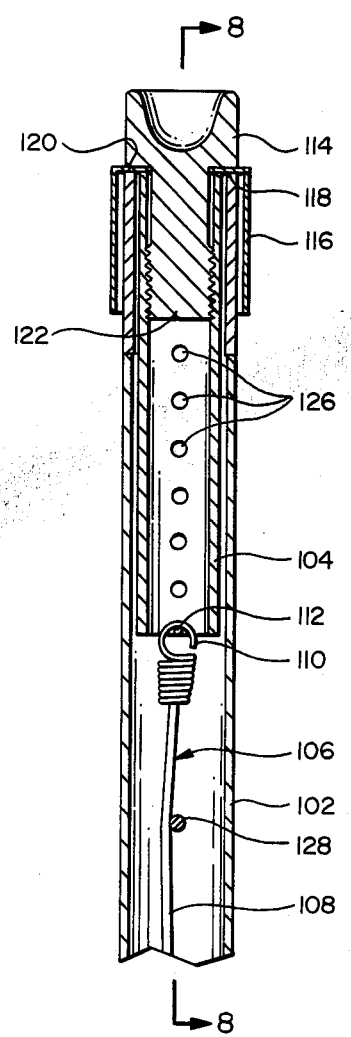

ON-BOARD TAIL JACK ASSEMBLY

This is a continuation, of application Ser. No. 497,697, filed May 24, 1983, now abandoned.

DESCRIPTION

TECHNICAL FIELD

The present invention relates, generally, to tail jack assemblies for stabilizing the tail of an aircraft during a loading or unloading procedure; and more especially, to an on-board tail jack assembly having a jack unit disposed within and an integral part of the aircraft and a strut configured for stowage in the aircraft during periods of nonuse and for bridging disposition between the jack and the ground in order to stabilize the craft during a loading or unloading procedure. The tail jack assembly of the present invention is principally configured for use in association with cargo aircraft where the wheelbase is toward the forward portion of the aircraft thereby yielding an inclination towards destabilizing rocking of the tail at times when the cargo load is within the tail region and the center of gravity of the craft tends to shift aft of the main gear.

DESCRIPTION OF THE BACKGROUND ART

While various types of aircraft have been designed in the past specifically to accommodate cargo loads as opposed to passengers, it is relatively commonplace for cargo haulers to utilize modififed passenger craft for these purposes. Many passenger craft designs include a forwardly disposed wheelbase configuration vis-a-vis the fuselage of the craft, an efficient and highly preferred design whether the aircraft be used for transporting passengers or cargo. However, one pronounced drawback in the context of cargo loading and unloading is a tendency for tail rocking about the main gear at times when the principal load is confined to the tail region of the craft and the center of gravity shifts in that direction; as occurs typically upon initial loading or near the end of unloading procedures. As can readily be imagined, where the load is housed only or principally within that tail region at such times, this type of destabilization or rocking is at the least troublesome and indeed can be damaging to both craft and cargo let alone pose emergency risk to the flight and/or ground crews.

A common expedient to overcome tail rocking during these times of cargo loading and unloading is simply to employ an aircraft jack to stabilize the tail of the craft. While that straightforward technique is a simple solution to the problem, maintaining the craft in its proper orientation while there is no forwardly disposed load countering that in the tail, it is not altogether satisfactory. Ground equipment of this sort has a surprising tendency to become lost or misplaced during normal airport operation. The equipment is oftentimes relatively complicated due to the requirement that it provide a constant load in spite of the changes in jack height as the airplane is loaded and/or unloaded, and that has rendered the same very susceptible to handling and use damage. Such damage interferes with the availability of the equipment which is problematic at best because there is no certain way to predict how many jacks will be needed at an airport at any one time or indeed where within the facility they may be needed. Availability or lack of it becomes increasingly serious with increases in the amount and diversity of air cargo services; a factor exacerbated when one considers the paramount importance of speedy loading/unloading for those cargo haulers devoted to handling letters and small packages, demanding frequent stops at many airport locations. Furthermore, considerable care must be exercised in order to avoid damaging the aircraft by improper use of the jack and, with more frequent and diverse usage, the damage hazard is likely to increase.

The prior art, of course, recognizes all manner and variety of jacking devices for lifting and/or stabilizing various types of vehicles including motor vehicles and aircraft. Exemplary of various aircraft jacks as components of ground equipment are those disclosed in U.S. Pat. Nos. 2,314,589, 2,369,545, and 2,392,786. In some instances, stabilizing structures are incorporated directly within a motor vehicle or aircraft. In the context of aircraft, U.S. Pat. Nos. 2,497,489 and 2,533,925 are representative. U.S. Pat. No. 1,957,151 is noteworthy for a disclosure of an airjack system disposed within a motor vehicle; comprising a central air reservoir in selective communcation with jack units associated with each wheel, whereby a preselected one of the jacks may be actuated to raise the vehicle at that location. Somewhat similar is the hydraulic jack unit of U.S. Pat. No. 2,194,594. Of general background interest are U.S. Pat. Nos. 2,391,384, 2,572,409 and 3,315,942; all of which deal with jack or stabilizing devices associated with a motor vehicle but none of which adds to the general scope of the references cited above.

As is now plainly evident from the foregoing background description, it would be desirable to provide a tail stabilization member specifically adapted for use in conjunction with a cargo aircraft in order to guard against tail rocking or like destabilization during loading and/or unloading procedures; one which eliminates the disadvantages of using conventional ground equipment for that purpose; and one which takes into account the most efficient and proper placement of the device vis-a-vis the craft to minimize the potential for damage to the latter while maximizing the simplicity and operational efficiencies of same in use.

SUMMARY OF THE INVENTION

The present invention advantageoulsy provides means for stabilizing the tail region of an aircraft during a loading or unloading procedure which may tend to displace the center of gravity of the craft aft of the main gear thereof and thereby contribute to or cause tail rocking. The present invention is desirable for its integral association with the craft in a manner which presents the stabilizing means in the most efficient and effective cooperative engagement therewith. Associating the unit in this manner minimizes if not precludes altogether damage hazards heretofore experienced when employing conventional ground equipment and further eliminates problems attendant the loss or misplacement of that type of ground equipment.

The foregoing, and other, advantages of the present invention are realized in a tail jack assembly for stabilizing the tail region of an aircraft during the loading and/or unloading procedures, comprising a jack unit disposed within and integral with the tail region of the aircraft in force communication with a frame member thereof for load transfer and distribution upon stabilizing actuation of the jack and a cooperative strut for bridging the jack unit and the runway. The jack unit includes a reciprocable jack ram member having a distal end terminating in a coupling while the strut is comprised of a shaft member having a proximal end terminating in a coupling member with a generally complementary geometric configuration respecting that of the jack. The strut is most preferably formed to include first and second shaft members disposed in biased, displaceable engagement therewith in order that the strut may be lengthened over an adjustable range.

The jack unit most preferably includes a double-acting hydraulic jack whereby the same may be driven upwardly and downwardly at the election of the operator. The jack itself is most preferably force coupled to the rear pressure bulkhead of the aircraft in order to transfer and thence dissipate the stabilizing load throughout the frame member. It is also preferred to include pressure relief means within the hydraulic system set to relieve the jack in the event load forces during stabilizing exceed a predetermined safety margin for the frame.

The strut is most preferably comprised of a first tubular shaft member receiving a second, also preferably tubular, shaft member interiorly thereof; the coupling for the strut being borne upon that second shaft member. A biasing member, most preferably a linear elastomeric cord, bridges the two shaft members to maintain the same as a unit. Each of the two shaft members includes at least one aperture, the apertures being disposed to permit longitudinal extension of the second shaft relative to the first and, upon registration in such an extended configuration, to receive a fixture member to maintain the strut in an extended, load-bearing configuration. Most preferably, the second shaft member includes an array of such apertures in order to provide a range of adjustability for the strut. In this manner, the strut may be positioned beneath the jack and extended into proximate engagement therewith should the jack experience an hydraulic failure, whereby the principal advantages of the present invention may nonetheless be realized.

Other advantages of the present invention, and a fuller appreciation of its construction and mode of operation, will be gained upon an examination of the following detailed description thereof, taken in conjunction with the figures of drawing, wherein:

BRIEF DESCRIPTION OF THE DRAWINGS

FIG. 6 is a side elevation view of a strut of the present assembly;

FIG. 7 is a sectional view, taken substantially along the line 7—7, showing the proximal end of the strut; and, FIG. 8 is a sectional view, taken substantially along the line 8—8 of FIG. 7, showing the strut in an extended position in association with the jack unit illustrated in phantom lines.

DETAILED DESCRIPTION OF PREFERRED EMBODIMENTS

The present invention relates, generally, to tail jack assemblies for stabilizing the tail of an aircraft during a loading or unloading procedure; and more especially, to an on-board tail jack assembly having a jack unit disposed within and an integral part of the aircraft and a strut configured for stowage in the aircraft during periods of nonuse and for bridging disposition between the jack and the ground in order to stabilize the craft when in use. The tail jack assembly of the present invention is principally configured for use in association with cargo aircraft where the wheelbase is toward the forward portion thereof thereby yielding a tendency for destabilization when load distribution is such that the center of gravity is aft of the main gear. Accordingly, the invention will now be described with reference to certain preferred embodiments within the aforementioned context; albeit, those skilled in the art will appreciate that such a description is meant to be exemplary only and should not be deemed limitative.

Figure 1:
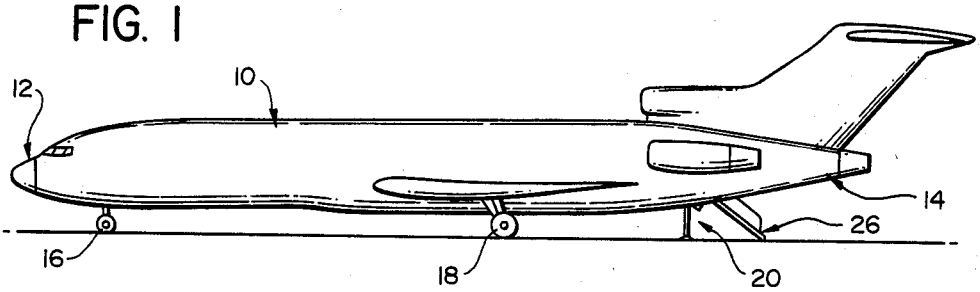
FIG. 1 is a side elevation view of an aircraft incorporating a tail jack assembly in accordance with the present invention for stabilizing the tail thereof during a loading/unloading procedure.

Turning to the figures of drawing, in all of which like parts are identified with like reference characters, FIG. 1 illustrates an aircraft designated generally as 10 having a nose 12 and a tail 14. A nose gear 16 and main gear 18 define a wheelbase for the craft 10, shown to be disposed toward the nose region thereof. When the craft 10 is employed for cargo transport, it is customarily loaded by placing cargo first within the tail region 14 and then loading foward, whereas an unloading procedure removes cargo first from the forward region of the craft. Accordingly, there are times when the center of gravity of the craft 10, by virtue of a predominant tail load, will shift aft of the main gear 18 giving rise to tipping or rocking about that gear. In order to prevent this occurrence, an on-board tail jack assembly designated generally as 20 is included as an integral component of the craft 10, stabilizing the tail region during those times of load imbalance.

The tail jack assembly 20 is comprised of two principal components, a jack unit identified generally as 22, disposed within and an integral part of the craft 10, and a strut identified generally as 24 which bridges the ground and the jack for stabilizing the tail. The strut is configured for stowage within the tail stairwell 26 during periods of nonuse, as this stairwell is used very infrequently when the craft 10 transports cargo. During periods of loading and unloading when the tail jack assembly 20 is employed for stabilization of the tail, the strut is readily accessible to the ground and/or flight crew member for cooperative engagement with the jack unit. Access to the jack unit 22 is made via a door 28 which comprises a portion of the skin of craft 10.

The jack unit 22 is most preferably an hydraulic jack with an hydraulic system independent of the hydraulic system of the aircraft 10. This type of independence is particularly preferred since it eliminates the potential for an overall hydraulic failure within the craft in the event the jack unit itself experiences failure. Regardless, the jack unit 22 is comprised of a jack 30, an accumulator 32 and a pump 34. In the exemplified embodiment, the jack includes a ram or shaft 36 disposed for linear, reciprocable motion within a cylinder or housing 38.

Figure 3:
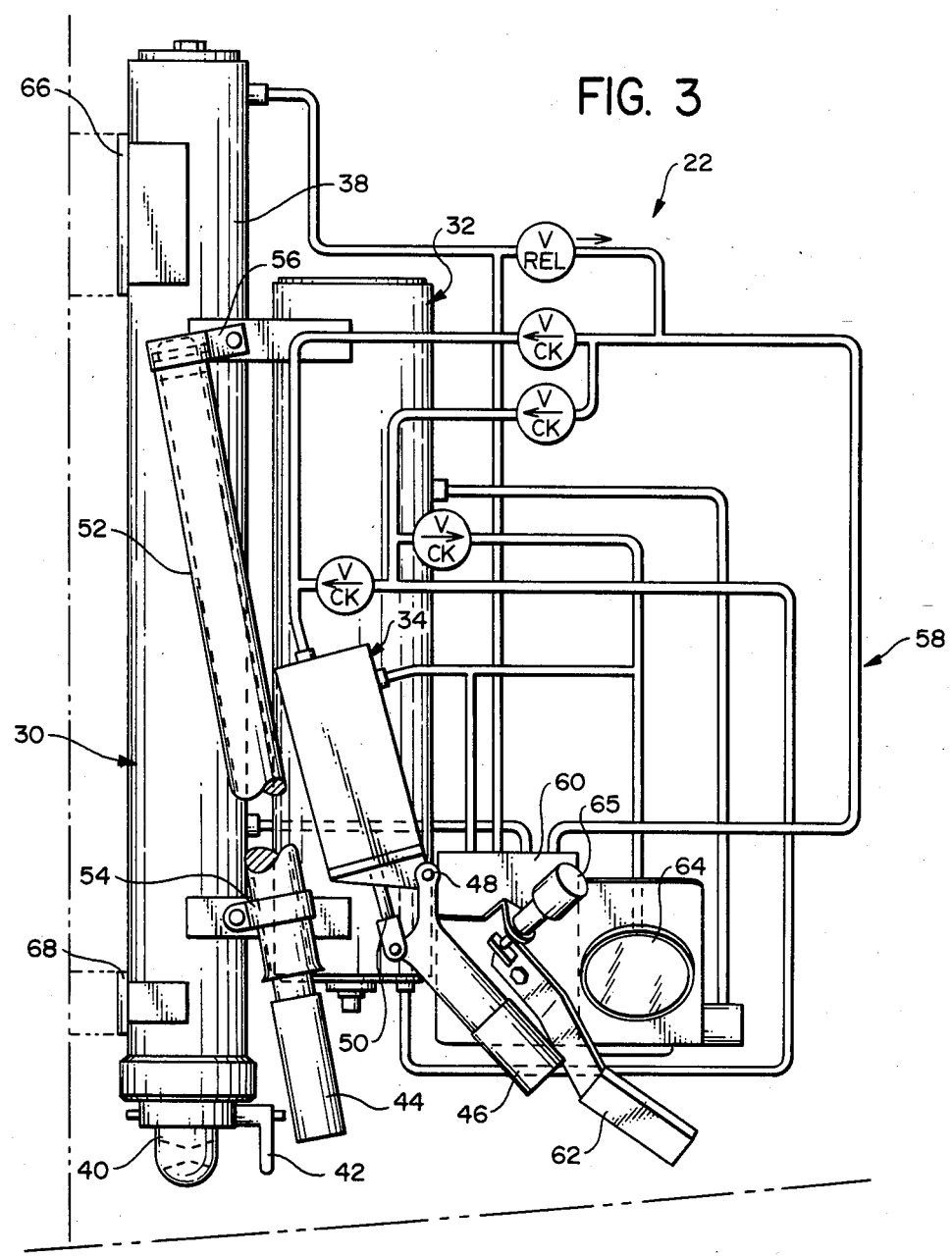
FIG. 3 is a side elevation view, partly schematic, showing the jack unit of the tail jack assembly in accordance with the present invention.
Figure 4:
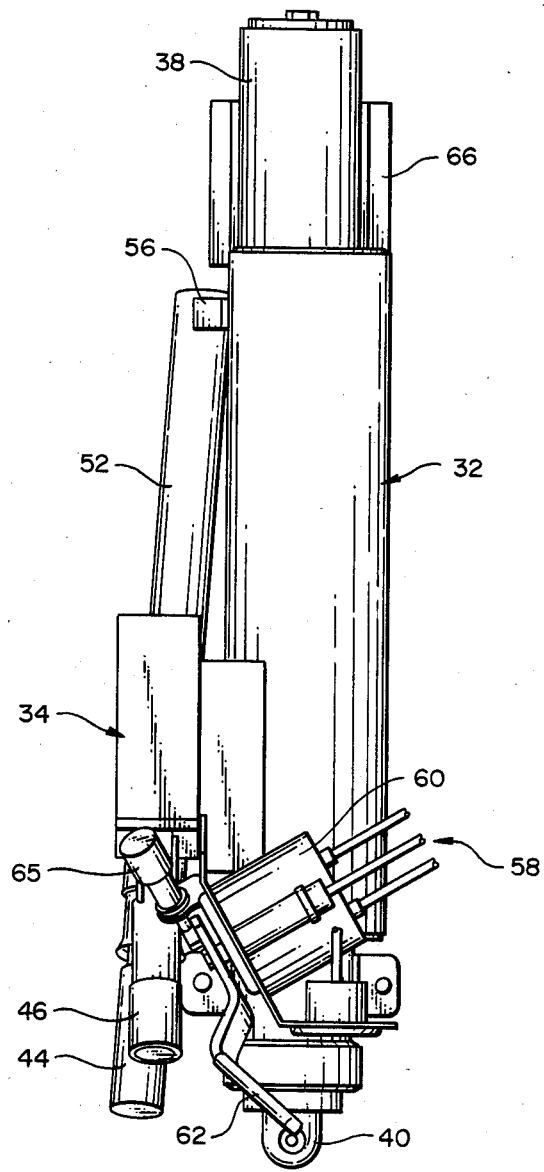
FIG. 4 is an end elevation view of the tail jack of FIG. 3.
Figure 5:
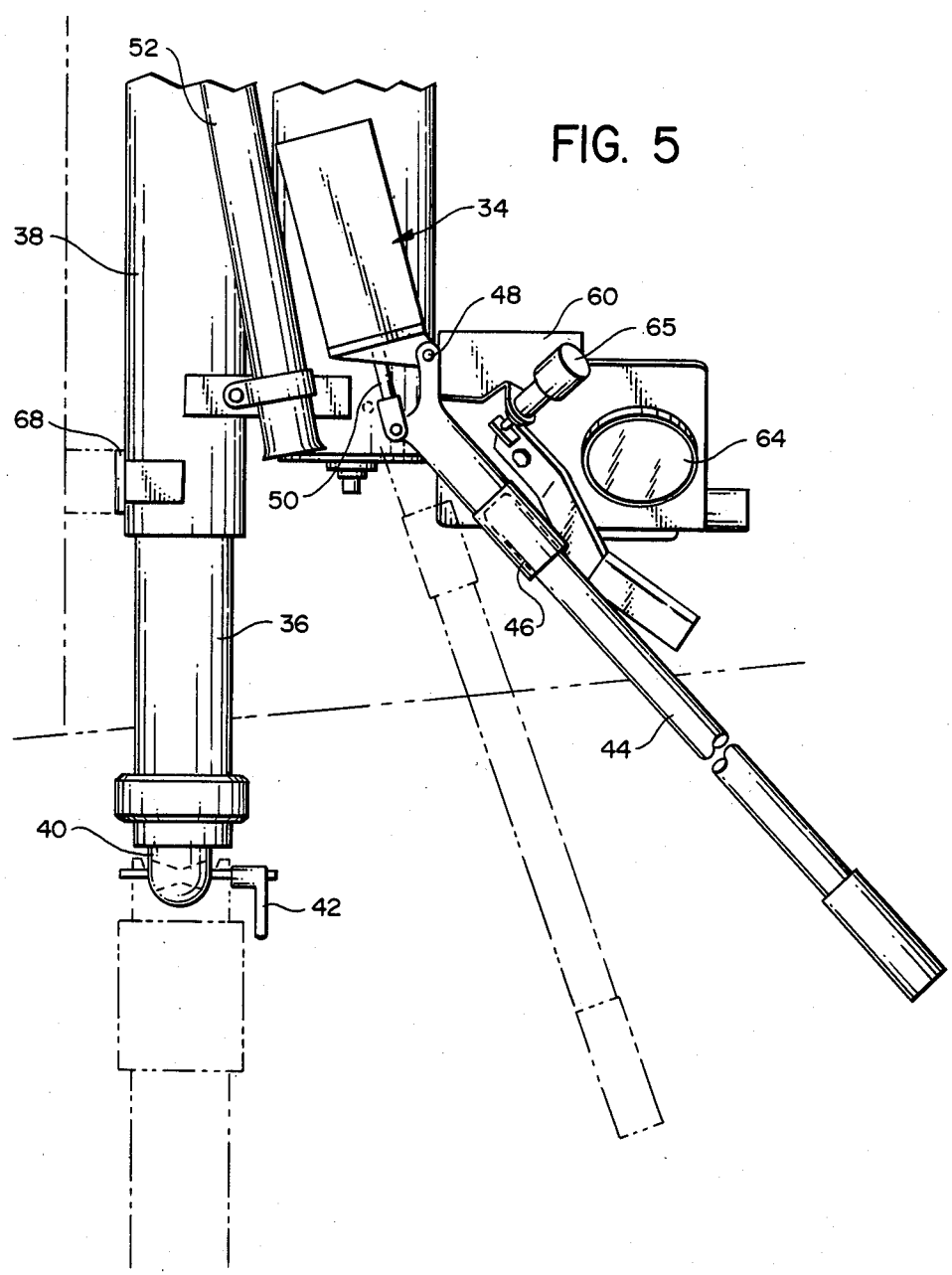
FIG. 5 is a fragmentary side elevation view of the jack unit of the assembly of the present invention, illustrated in a partially deployed position and in engagement with a strut of the assembly, the latter shown in phantom lines.

The distal end of the ram 36 terminates in a coupling member 40 for cooperative engagement with a complementary element on the strut 24, as described more fully hereinbelow. A retaining or keeper pin 42 is preferably disposed through the ram 36 during times of nonuse in order to maintain the same in the configuration shown, for example, in FIG. 3. This holds the ram against the residual pressure in the accumulator responsible, in the first instance, for driving the ram downwardly. When it is desired to operate the jack, residual hydraulic pressure within the accumulator 32 thus drives the ram; but if that proves to be insufficient for that purpose, the pump 34 may then be manually manipulated by a pump handle 44. Comparing, for example, FIGS. 3 and 5, the handle is configured for mating disposition within a socket 46, pinned for pivotal movement about a joint 48 in order to reciprocate a stem 50 of the pump 34. During periods of nonuse, the handle 44 is stowed by insertion within a sleeve 52 secured to the jack unit by means of collars 54 and 56. Thus, the handle 44 is maintained in a convenient location minimizing the risk it will be lost or misplaced and therefore unavailable when needed.

The jack is most preferably a double-acting jack whereby the ram 36 may be driven positively upwardly or downwardly within the housing 38 in order to retract or extend the same during operation. Accordingly, an hydraulic distribution system designated generally as 58 is incorporated to route fluid as may be required either to extend or to retract the ram upon manipulation of the pump 34. Suitable check valving is incorporated to regulate flow direction and, as this forms no independent part of the present invention, warrants no detailed description herein. Suffice it to say that the direction of travel of ram 36 is governed by an hydraulic valve 60 controlling the flow direction of fluid through the system, itself being operated by a lever 62 bearing suitable indicia to inform the operator of the direction of travel of ram 36. A pressure gauge 64 is included to inform the operator that the system is properly pressurized. The hydraulic distribution system 58 includes a pressure relief valve having a setting correlated to the maximum force desired to be applied to the frame as may be determined by the designer. Thus, in the event an excessive force is inadvertently applied or is subsequently developed during use, the pressure relief valve will protect the frame from damaging force loads. A switch 65 is included to provide a signal to a control panel within the craft for a visual indication to the crew that the jack is in place and the system properly pressurized.

The jack unit 22 is disposed within the aircraft 10 in such a manner as to transfer most efficiently and distribute most effectively the forces developed during use of the assembly 20. It has been determined that a most preferred design is one where the jack 30 includes vertical mounting slides 66 and 68, respectively at the proximal and distal ends thereof, which cooperate with a vertical mount in direct communication with the rear pressure bulkhead which takes pressurization loads and torsional loads into the fuselage of the craft 10. This pressure bulkhead is a sturdy assembly comprised of "I"-beam and flat sheet metal webs and provides the most preferred mounting location. The forces transmitted through the jack mounting means to the pressure bulkhead are those developed upon stabilizing actuation of the jack 20 in cooperative engagement with the strut assembly.

Figure 2:
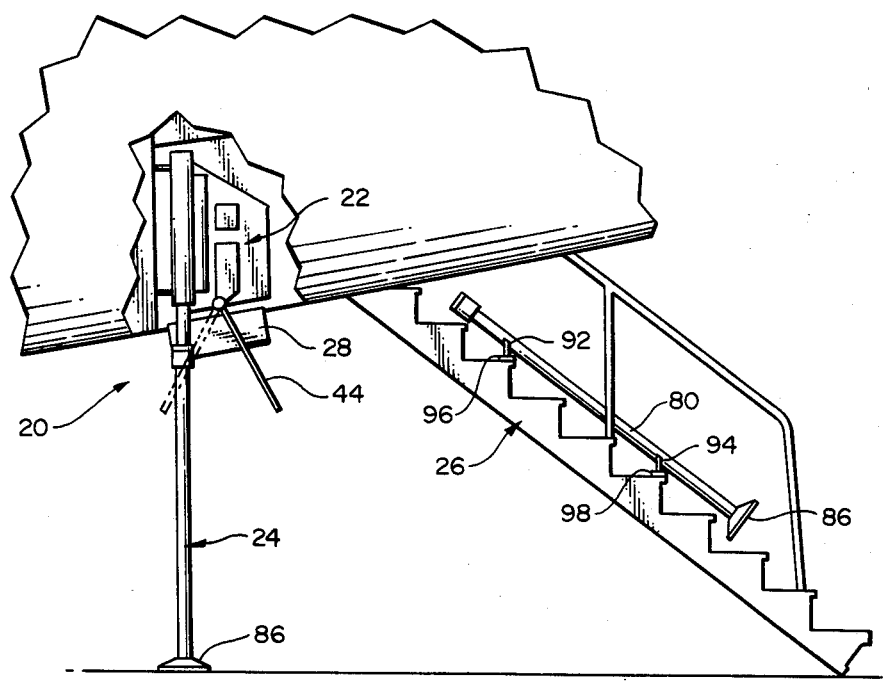
FIG. 2 is a fragmentary side elevation view, with parts broken away, showing in greater detail the tail jack assembly of FIG. 1.
Figure 8:
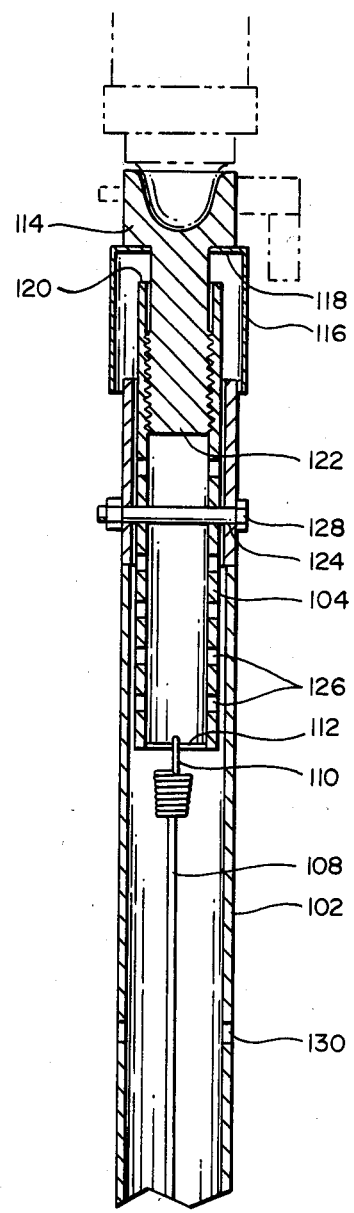

The strut 24, best viewed in FIGS. 6–8, is comprised of a generally linear shaft designated generally as 80, having a proximal end 82 configured for cooperative engagement with the ram 36 of jack unit 22 and a distal end 84 bearing a load shoe designated generally as 86. The shoe 86 is secured to the shaft 80 at a pivotal juncture 88 to accommodate variations in runway contour, position of the craft, and like vagaries, in order to present the bottom surface 90 of the shoe in firm engagement with the runway while transferring loads as nearly uniformly along the axis of shaft 80 as is possible. In order further to improve upon stabilization of the tail in light of anticipated load variations, it is also preferred to inlcude a charge of compressed nitrogen above the hydraulic fluid within the jack unit to yield a type of self-regulation with these same thoughts in mind. Regardless, the shaft includes first and second mounting pins 92 and 94, shown in FIG. 6 to be disposed at an angle respecting the longitudinal axis of the shaft, which angle is selected to allow the strut 24 to be retained within the stairwell 26 as best viewed in FIG. 2. In this highly preferred embodiment, each of the mounting pins 92 and 94 includes a reduced diameter tip configured for acceptance within fixture means 96 and 98 secured to stairtreads on the stairwell 26. For the sake of convenience, elastomeric cords are provided in order to maintain the mounting pins within the respective fixture means during periods when the assembly is not being used. A handle member 100 is also preferably included for ease of grasping and manipulating the strut 24.

The shaft 80 is most preferably comprised of first and second cooperative shaft members 102 and 104, respectively. In the embodiment shown, the first shaft member 102 is a tubular shaft defining the overall outer geometry of shaft 80, while the second shaft member 104 is a post-like member disposed interiorly within the proximal end of the tube 102. A biasing means designated generally as 106 secures the post 104 within the tube 102 in order that the former is adjustably displaceable along the longitudinal axis of the latter. In the exemplified embodiment, the biasing means 106 is an elastomeric cord 108 spanning the distal end of post 104 and that of the tube 102. Hooks 110 are provided at either end of the cord 108 (only the upper being shown) for engagement with a bar or pin 112 associated with each of these shaft members. The length of cord 108 is sized to maintain the two shaft members 102 and 104 securely while allowing linear displacement against its restraining force.

The upper end of the post or second shaft member 104 includes a coupling member 114 for mating engagement with the coupling 40 of the jack unit. In this instance, the coupling is in the form of a generally hemispherical recess or socket for receiving the ball-shaped coupling member of the jack; albeit, any complementary configuration respecting these two members might equally well be employed. In this preferred embodiment, wherein the two coupling members constitute a type of ball joint allowing for some relative angular displacement between the strut 24 and jack unit 22, the coupling member 114 may optionally but preferably include an aperture through which the retaining or keeper pin 42 may be inserted as shown in phantom lines, for example, in FIGS. 5 and 6. Irrespective of that configuration, and with an eye toward minimizing the weight of the strut unit, the post or second shaft member 104 is most preferably itself a tubular member receiving the coupling 114 as shown, for example, in FIG. 7. That arrangement provides good physical integrity for the coupling area while reducing the mass required for the shaft member. As viewed by comparison of FIGS. 7 and 8, the second shaft member 104 includes a collar 116 to provide an abutment surface 118 for contacting an abutment surface 120 at the extreme proximal end of shaft 102. The coupling member 114 includes a stepped geometry, having a shank 122 shown to be in threaded engagement interiorly of the shaft member 104, and then expanding radially outward to accommodate these abutment surfaces. Thus, the load on the strut is carried across the abutment surfaces to the tubular shaft member 102.

The strut 24 is dimensioned over its length to take into account the normally anticipated distance between the terminus of ram 36 and the surface of the runway. Of necessity, it is dimensioned to have a length somewhat shorter than the minimum expected distance to be spanned by this member to allow for proper positioning. However, it is also to be anticipated that the jack unit itself may experience a failure rendering the same inoperable; a consideration mentioned above in respect of the independent hydraulic system therefor. In light of that contingency, the two-piece design allows the crew to obtain the fundamental benefits of this invention notwithstanding the potential for such an hydraulic failure.

In the preferred embodiment shown in FIGS. 6-8, an aperture 124 is formed within the tubular shaft member 102. At least one, and preferably a complementary array of apertures 126 is formed in the second shaft member 104, as best viewed in FIG. 7. The two shaft members 102 and 104 can be displaced linearly against the force of biasing means 106 in order to present a selected one of the apertures 126 in registration with the aperture 124 to adjust the overall length of the strut 24. With those selected apertures in registration in that manner, a fixture bolt 128 may be inserted therethrough to maintain the two members in that configuration. For the sake of convenience, the fixture bolt is normally housed in a secondary aperture 130 provided through the shaft member 102 to guard against its loss or misplacement.

In operation, the on-board tail jack of the instant invention is both simple and efficient in stabilizing the tail region 14 of craft 10. Prior to a loading or an unloading procedure which has the potential for shifting the center of gravity of the craft aft of the main gear 18, the jack unit 22 is exposed by opening the door 28 and the strut 24 is removed from its stowed position within stairwell 26. The strut is positioned to present coupling 114 beneath the jack coupling 40, the pivotal disposition of shoe 86 accounting for variations in runway contour, position of the craft and the like. The keeper pin 42 is withdrawn and, under most circumstances, the ram 36 will fall slowly under the influence of residual pressure within the accumulator allowing the coupling members to mate; or, if the residual pressure is too low, the operator may pump the ram down to mate with the strut. In those embodiments where the strut includes the optional aperture as well, the keeper pin may be inserted through the coupling in order to maintain positive integrity between the two components. The direction of travel of the jack ram is controlled by manipulation of lever 62 which, in turn, controls fluid valve 60 and routes hydraulic fluid throughout the distribution system 58 as required. Initially, the lever will be manipulated to an "extend" position to allow the ram to fall or perhaps to drive it downwardly (although, under some circumstances, it may first be retracted slightly to relieve any binding force on the keeper pin). The stabilization forces developed upon actuation are transmitted via the shoe, through the strut and jack to the mounts and, ultimately, the pressure bulkhead structure of the aircraft for best distribution to the load-bearing members of the aircraft frame. In the event the force developed during a loading or unloading procedure exceeds the safe design limits, the pressure relief valve of the hydraulic distribution system will provide the necessary margin of safety. And too, some regulation is achieved by incorporating the charge of compressed nitrogen within the jack unit as mentioned above. When the loading or unloading procedure is through, the lever 62 is moved to a "retract" position and the pump manipulated by handle 44 to return the system to its flight configuration.

In the event the pump unit fails, the principal benefits of the invention are nonetheless realized. The strut may be positioned in the same manner aforesaid, and the collar 116 grasped to extend the shaft member 104 upwardly within the shaft member 102, against the force of biasing means 106, to present the two couplings 40 and 114 in as close to mating engagement as permitted by the ability to register the aperture 124 in shaft 102 with a preselected one in the array 126 as in shaft member 104. With that selection made, the fixture bolt 128 may then be inserted through the two shaft members. In this instance, the forces are transmitted through the inner shaft member 104 and the fixture bolt to the shaft member 102. Thus, the overall assembly remains operable regardless of a jack failure.

While the invention has now been described with reference to certain preferred embodiments, those skilled in the art will appreciate that various substitutions, modifications, changes and omissions may be made without departing from the spirit thereof. Accordingly, it is intended that the foregoing description be viewed merely as exemplary and not limitative of the scope of the claims granted herein.

I claim:

1. A tail jack assembly for stabilizing an aircraft having a bulkhead in the rear section of its fuselage during a loading or unloading procedure which tends to displace the center of gravity of said aircraft to the rear of the main gear thereof, comprising:
    a. a dedicated jack unit adapted to be disposed completely within the tail section of the aircraft and to be accessed through an opening in the belly of the aircraft for transferring loads from the aircraft to the surface on which the aircraft is standing upon stabilizing actuation of said jack unit, said jack unit including a hydraulic cylinder adapted to be mounted on said bulkhead and a ram housed in and rectilinearly extensible with respect to said hydraulic cylinder, said ram having a distal end terminating in a first coupling means; and
    b. an elongated strut for bridging said jack unit and the surface on which the aircraft is standing, said strut being detachable from the jack unit for stowage within the aircraft and said strut including shaft means having a proximal end terminating in a second coupling means with a geometric configuration which is complementary with the configuration of the first coupling means for mating engagement therewith and a distal end which carries a shoe means that is engageable with the surface on which the aircraft is standing and is configured to distribute the jack-supported weight over that surface, and said shaft means including a first shaft member, a second shaft member telescopically housed in the first shaft member, means for fixing said first and second shafts together in any one of a plurality of extended relationships, and means biasing said shafts toward a collapsed relationship and securing the shafts together.

2. A tail jack assembly as defined in claim 1 for stabilizing an aircraft which also has a dedicated onboard stairway that furnishes access to the rear section of the aircraft, the jack assembly also including means for stowing said strut by detachably fixing it to said stairway.

* * * * *